July 15, 1930.  L. M. HACKETT  1,770,773
OIL AND GAS SEPARATOR
Filed Aug. 17, 1927   3 Sheets-Sheet 2
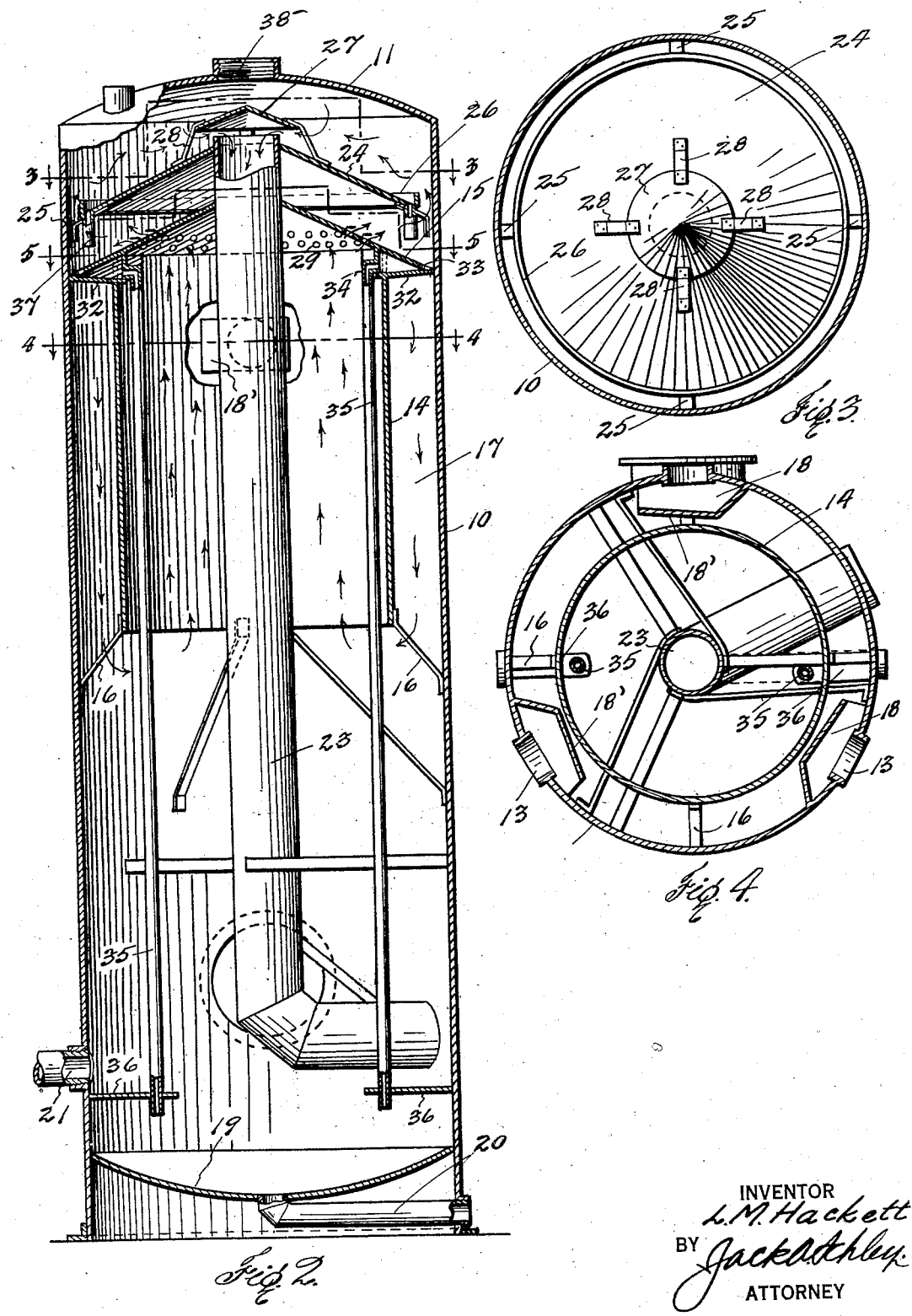

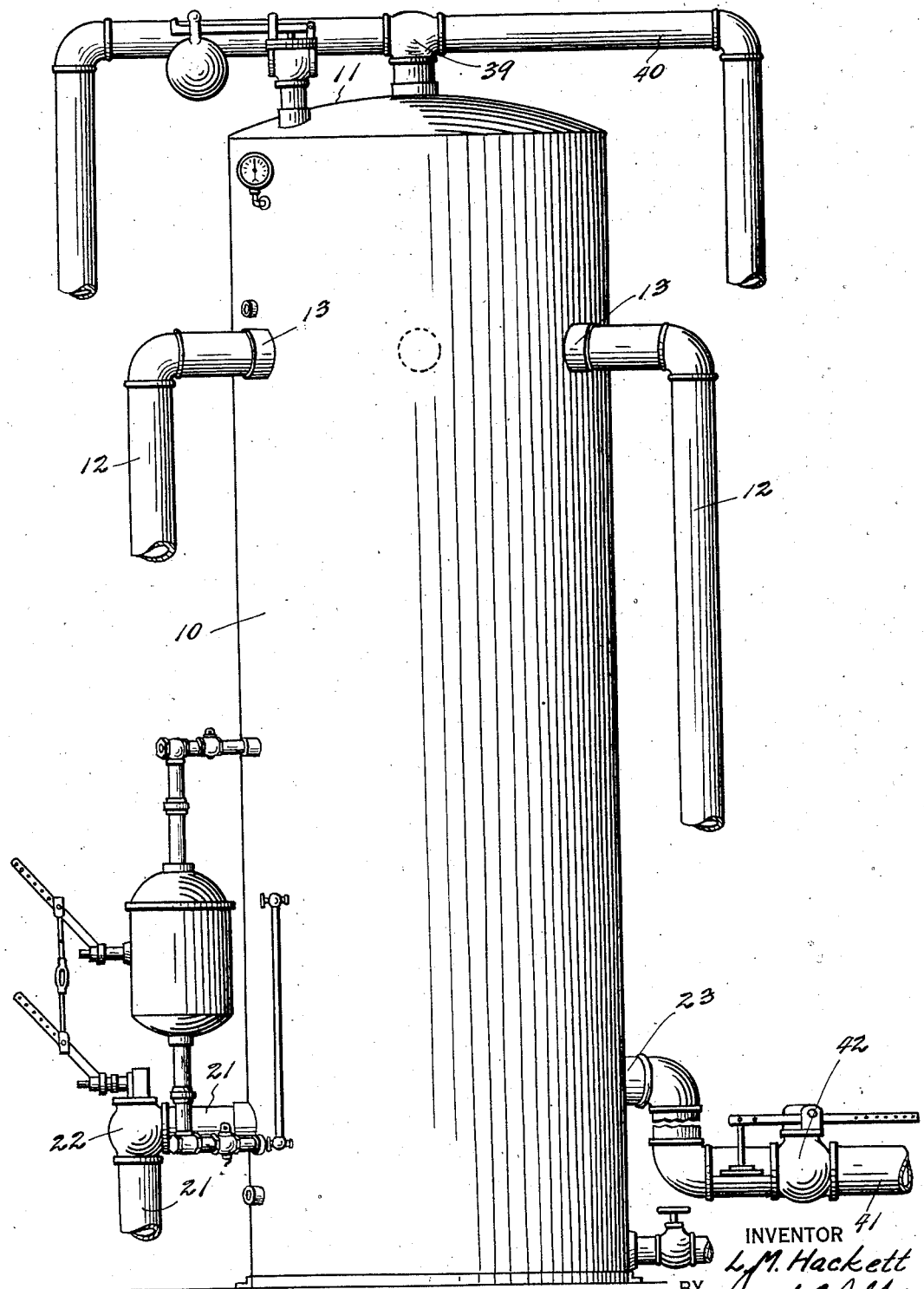

July 15, 1930.  L. M. HACKETT  1,770,773
OIL AND GAS SEPARATOR
Filed Aug. 17, 1927    3 Sheets-Sheet 3
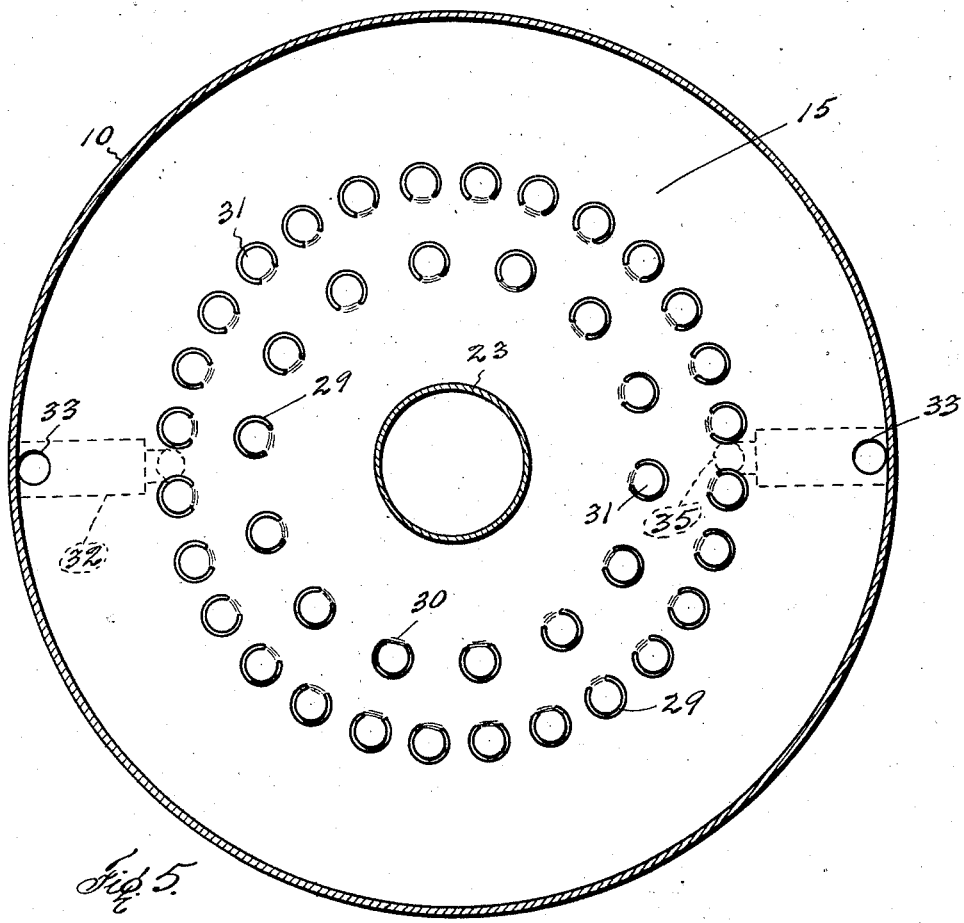
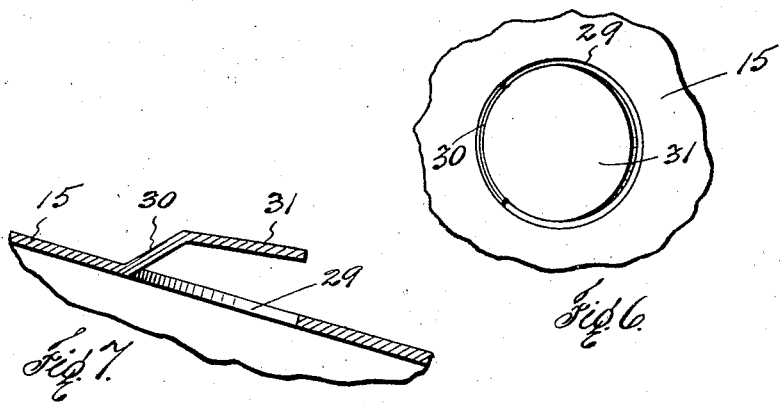
INVENTOR
L. M. Hackett
BY Jack A. Schley.
ATTORNEY Patented July 15, 1930

1,770,773

UNITED STATES PATENT OFFICE

LEWIS M. HACKETT, OF OKLAHOMA CITY, OKLAHOMA, ASSIGNOR TO AMERICAN TANK COMPANY, OF OKLAHOMA CITY, OKLAHOMA, A CORPORATION OF OKLAHOMA

OIL AND GAS SEPARATOR

Application filed August 17, 1927. Serial No. 213,492.

This invention relates to new and useful improvements in oil and gas separators.

One object of the invention is to provide a separator for receiving oil and gas from a flowing or pumped well and thoroughly separating the liquids from the gases in an efficient and expeditious manner.

A particular object of the invention is to provide baffles arranged to prevent back-flowing liquids from entering openings in the same through which the influent passes.

An important object of the invention is to provide deflectors associated with passages in a baffle arranged to retard the passage of the influent therethrough and cause the liquids to drop back and thus be released.

Another object of the invention is to provide an improved baffle arrangement which will more efficiently separate the liquids and gases.

A further object of the invention is to provide a particular form of liquid drain for the baffles arranged to carry off the collected liquids without impeding the flow of the influent.

A still further object of the invention is to provide an improved form of deflector box at the tank inlet arranged to direct the flow and to initially break the force of the influent.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is an elevation of a gas and oil separator constructed in accordance with the invention, Fig. 2 is a vertical sectional view of the same, Fig. 3 is a horizontal cross-sectional view taken on the line 3—3 of Fig. 2, Fig. 4 is a horizontal cross-sectional view taken on the line 4—4 of Fig. 2, Fig. 5 is an enlarged horizontal cross-sectional view taken on the line 4—4 of Fig. 2, Fig. 6 is a detail of one of the baffle openings and deflectors, and Fig. 7 is a sectional view of the same.

In the drawings the numeral 10 designates an upright cylindrical metal tank having a bulged top 11, the shape and material however being subject to variation. A short distance below the top fluid inlet pipes 12 enter collars 13 in the sides of the tank at equidistant points. A cylindrical skirt 14 hangs from a conical baffle 15 and is supported at its lower end by brackets 16. The lower end of the skirt is located at the central portion of the tank.

The baffle 15 has its edges welded or otherwise fastened to the inner wall of the tank, thus sealing off said tank at this line. The skirt is somewhat less in diameter than the tank, thereby providing an annular space 17 therebetween closed at its top by the baffle 15.

Each pipe 12 through its collar 13 discharges fluid from the well into a deflector box 18 secured to the inner wall of the tank and open at one end only. The boxes are directed counter-clockwise. The collar 13 is located at the central portion of each box so that the impact of the in-rushing influent is taken by the back wall 18' thereof, thus breaking the force. Each box is contracted toward its discharge end which tends to slightly choke the influent and to direct it against the inner wall of the tank, whereby it will take a circumferential path in the space 17.

The inflowing fluid comprising oil, water and gas takes a circumferential course around the skirt and is directed downwardly in seeking an escape under the skirt 14. The heavier fluids will be separated and running down the walls of the tank and skirt will be collected at the bottom of the tank. A disk shaped bottom 19 in the lower portion of the tank has a drain pipe 20 for carrying off the B. S. An oil outlet pipe 21 leads from the lower end of the tank and is controlled by a float valve 22 in the usual manner. This arrangement maintains an oil level in the tank and permits a gas pressure to be built up in the tank. A gas discharge flue 23, open at its upper end, leads down through the center of the tank out through one side thereof.

One of the important features of the invention is the baffle arrangement. Above the baffle 15 is a second or top conical baffle 24, less in diameter than the baffle 15, and having its lower edge spaced from the inner wall of the tank by supporting brackets 25. The gas flue 23 terminates just above the baffle 24. An upstanding circular flange 26 surrounds the edge of the top baffle 24, thus forming an annular collecting trough. A conical deflector 27 supported above the flue by brackets 28 overhangs the top baffle.

An important feature of the lower baffle 15 resides in circular rows of circular openings or ports 29 surrounding the flue 23 within the skirt, as is shown in detail in Figs. 5, 6 and 7. In forming these ports the circular disk of metal is not cut out entirely but is left connected to the baffle by a shank 30, while the plate or disk 31, which may be smaller than the port, is bent from the shank. The disk 31 is spaced from the port on the upper side of the baffle, but overhangs said port. Each disk is flared from the baffle slightly so as to permit a free escape of the gases.

The influent passes under the lower edge of the skirt 14 and rises therein, the liquids collecting on the inner walls and running down. The fluids seek to escape through the ports 29 and encounter the deflectors formed by the shanks 30 and disks 31. These deflectors retard the flow and throw back the heavier liquids which fall through the skirt. This forms a very effective means of separation. It will be noted that the shanks 30 are located at each port to obstruct and deflect the liquids flowing down the baffle, thus preventing such liquids from flowing down through the ports.

The baffle 15 being inclined and fastened to the wall of the tank forms an annular trough contiguous to the tank in which the down-flowing liquids are collected. Drain boxes 32 are secured to the under side of the baffle and openings 33 on opposite sides of the baffle, at its edge, drain the liquids from the baffle trough into said boxes. Elbows 34 connect the inner ends of the boxes with drain pipes 35 extending to the lower end of the tank and held by brackets 36.

Drain tubes 37 depend from the trough of the baffle 24 thus discharging the liquids onto the baffle 15. Above the deflector 27 is an outlet collar 38, which is connected with a coupling 39 in which pipes 40 are inserted. Gas may be conducted through the collar and pipes 40 and through the flue 23. The flue 23 is connected with a gas conducting pipe 41 having a pressure regulating valve 42, whereby a gas pressure is built up in the tank. The outlet 38 is usually employed to take care of an excess of gas, the normal discharge being through the flue 23. The fluids passing through the ports 29 and scrubbing against the deflectors 31, around and under the baffle 24 and deflector 27 will be robbed of their liquids which will flow down the baffles and finally be conducted by the pipes 35 to the bottom of the tank.

Various changes in the size and shape of the different parts, as well as modifications and alterations, may be made within the scope of the appended claims.

What I claim, is:

1. In an oil and gas separator, a vertical tank, a conical baffle in the upper portion of the tank, a skirt disposed beneath the baffle and spaced from the tank, the baffle sealing the top of the space between the tank and the skirt, inlets in the tank, deflector boxes over the inlets within the space between the tank and the skirt, the baffle having ports and deflectors above said ports and directed outwardly toward the tank, a second baffle in the tank above the first baffle and spaced from the tank wall, a gas outlet, and an oil outlet.

2. In an oil and gas separator, a vertical tank, a conical baffle in the upper portion of the tank, a skirt disposed beneath the baffle and spaced from the tank, the baffle sealing the top of the space between the tank and the skirt, inlets in the tank, deflector boxes over the inlets within the space between the tank and the skirt, the baffle having ports and deflectors above said ports and directed outwardly toward the tank, a second baffle in the tank above the first baffle and spaced from the tank wall, a gas outlet flue leading from above the upper baffle down through the baffles and discharging through the lower portion of the tank, and an oil outlet.

3. In an oil and gas separator, a vertical tank, a cylindrical skirt in the tank, a conical baffle overhanging the skirt and fastened to the inner wall of the tank, said baffle having escape ports provided with overhanging deflectors for retarding the upward flow of fluids and directing the same laterally of such flow, a drain leading from said baffle, a second baffle in the tank spaced above the first baffle and also spaced from the tank, a liquid collecting trough on the second baffle having a drain to the first baffle, a gas outlet flue extending down through the baffles, and an oil outlet.

4. In an oil and gas separator, a transverse inclined baffle, drain boxes secured to the under side of the baffle at its base, pipes extending downward from the boxes, a second baffle of less diameter above the first baffle, a circular flange on the second baffle, and a drain tube discharging from the second baffle upon the first baffle.

5. In an oil and gas separator, an inclined baffle having ports therein, and deflectors cut and bent upwardly from said ports and each including a shank by which it is connected to the baffle, and a plate overhanging the port and disposed substantially parallel thereto.

6. In an oil and gas separator, a conical baffle having ports therein, and deflectors overhanging the ports and having shanks by which they are connected to the baffle, said shanks in each instance being located at the side of the port next the center of the deflector and in the path of liquid flowing down the baffle.

7. In an oil and gas separator, a vertical tank, a conical baffle in the upper portion thereof joining the tank wall, a skirt beneath said baffle and spaced from the tank, inlets into the tank communicating with the space between the skirt and tank, said baffle having ports and deflectors above said ports disposed to direct a flow of fluid outwardly toward the tank, a solid baffle in the tank above the first baffle and spaced from the tank wall, a gas outlet flue leading from above the upper baffle, and an oil outlet from the tank.

In testimony whereof I affix my signature.

LEWIS M. HACKETT.